(12) United States Patent
Nobori (10) Patent No.: US 9,621,862 B2
(45) Date of Patent: Apr. 11, 2017

(54) PROJECTOR AND METHOD OF CONTROLLING PROJECTOR

(71) Applicant: SEIKO EPSON CORPORATION, Tokyo (JP)

(72) Inventor: Tatsuhiko Nobori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 295 days.

(21) Appl. No.: 14/571,927

(22) Filed: Dec. 16, 2014

(65) Prior Publication Data

US 2015/0172591 A1 Jun. 18, 2015

(30) Foreign Application Priority Data

Dec. 18, 2013 (JP) ................................ 2013-261163

(51) Int. Cl.
| | |
|---|---|
| G03B 21/14 | (2006.01) |
| H04N 9/31 | (2006.01) |
| G03B 21/00 | (2006.01) |

(52) U.S. Cl.
CPC ......... *H04N 9/3155* (2013.01); *G03B 21/006* (2013.01); *H04N 9/3102* (2013.01); *H04N 9/3108* (2013.01); *H04N 9/3182* (2013.01); *H04N 9/3194* (2013.01)

(58) Field of Classification Search
CPC ............... H04N 5/7408; H04N 5/7441; H04N 2005/745; H04N 9/31; H04N 9/3102; H04N 9/3105; H04N 9/3108; G03B 21/005; G03B 21/006; G03B 21/008
See application file for complete search history.

(56) References Cited

U.S. PATENT DOCUMENTS

| | | | | |
|---|---|---|---|---|
| 2005/0248737 | A1* | 11/2005 | Engle | G03B 21/005 353/122 |
| 2006/0170883 | A1* | 8/2006 | Matsui | G09G 3/3413 353/85 |
| 2007/0165194 | A1* | 7/2007 | Jung | G02B 26/0833 353/99 |
| 2010/0328609 | A1* | 12/2010 | Silverstein | G03B 35/26 353/7 |
| 2011/0279743 | A1 | 11/2011 | Kuroda | |
| 2011/0292307 | A1* | 12/2011 | Yagi | H04N 9/3126 349/8 |
| 2012/0224110 | A1* | 9/2012 | Kawamoto | G02B 26/008 348/760 |

FOREIGN PATENT DOCUMENTS

| | | |
|---|---|---|
| JP | A-2011-97592 | 5/2011 |
| JP | A-2011-237637 | 11/2011 |
| WO | WO 2004/047430 A1 | 6/2004 |

* cited by examiner

*Primary Examiner* — William C Dowling
(74) *Attorney, Agent, or Firm* — Oliff PLC (57) ABSTRACT

A projector that displays an image based on image data, includes a light source; a modulation unit that modulates light which is emitted from the light source based on the image data; and a correction processing unit that controls the modulation unit so as to compensate for an influence of light reflected from the modulation unit to the light source side, based on luminance of the image data.

12 Claims, 4 Drawing Sheets

PROJECTOR AND METHOD OF CONTROLLING PROJECTOR

The entire disclosure of Japanese Patent Application No. 2013-261163, filed Dec. 18, 2013, is expressly incorporated by reference herein.

BACKGROUND

1. Technical Field

The present invention relates to a projector and a method of controlling the projector.

2. Related Art

Recently, it is known that a projector modulates light emitted from a light source using a liquid crystal display panel, and projects an image (refer to, for example, JP-A-2011-97592 and JP-A-2011-237637). In JP-A-2011-97592, a reflection type liquid crystal display panel as a modulation unit is provided, light emitted from a light source is reflected by a mirror, and applied to the liquid crystal display panel, and the reflected light of the liquid crystal display panel is projected. In addition, the projector described in JP-A-2011-237637 includes three liquid crystal display panels corresponding to wavelength bands of blue, red, and green, and condenses the light modulated by each liquid crystal display panel to project.

However, at an inside of the projector, an optical component such as a lens or a mirror, alternatively the reflected light or the transmitted light of the liquid crystal display panel may cause unintended influence. For example, in a configuration using a reflection type liquid crystal display panel, the light reflected by the liquid crystal display panel is superimposed with light incident on the liquid crystal display panel, and light intensity is changed. There is a possibility that such a change of the light intensity causes an influence on an image display quality. For example, in the same manner as in the projector described in JP-A-2011-237637, in a configuration in which light of a plurality of colors is modulated and condensed, if a balance of light intensity of color is disturbed, deviation of white balance occurs, which is not desired.

SUMMARY

An advantage of some aspects of the invention is that a display quality is prevented from decreasing due to an influence of the reflected light of a projector.

An aspect of the invention is directed to a projector that displays an image based on image data, including: a light source; a modulation unit that modulates light which is emitted from the light source based on the image data; and a correction processing unit that controls the modulation unit so as to compensate for an influence of light reflected from the modulation unit to the light source side, based on luminance of the image data.

According to the aspect of the invention, the projected image can be corrected in such a manner that the influence of the reflected light is compensated for. For this reason, it is possible to prevent a display quality from decreasing, without variance of the luminance of the projected image, or deviation of color balance due to the influence of the reflected light.

In the projector according to the aspect of the invention, the correction processing unit may control the modulation unit so as to suppress an increase of luminance occurring due to the influence of the reflected light.

According to the aspect of the invention with this configuration, it is possible to suppress an increase of the luminance due to the influence of the reflected light, and to prevent the display quality from decreasing.

In the projector according to the aspect of the invention, the correction processing unit may control the modulation unit so as to compensate for the influence of the reflected light, in a case where a peak value of the luminance of the image data is greater than a value that is set in advance.

According to the aspect of the invention with this configuration, in a case where the luminance of the projected image is high, the control for compensating for the influence of the reflected light is performed, and thus, it is possible to prevent the display quality from decreasing.

In the projector according to the aspect of the invention, the correction processing unit may not control the modulation unit so as to compensate for the influence of the reflected light, in a case where a peak value of the luminance of the image data is lower than a value that is set in advance.

According to the aspect of the invention with this configuration, in a case where the luminance of the projected image is low, the control for compensating for the influence of the reflected light is not performed. That is, the projected image in which the influence of the correction is likely to excessively occur is not corrected, and thus it is possible to prevent the correction from being excessively performed.

In the projector according to the aspect of the invention, the correction processing unit may include a correction amount calculation unit that estimates intensity of the reflected light based on the luminance of the image data and calculates an amount of correction corresponding to the estimated intensity of the reflected light, and a correction unit that controls the modulation unit based on the amount of correction which is calculated by the correction amount calculation unit.

According to the aspect of the invention with this configuration, the intensity of the reflected light is estimated, and thereby it is possible to appropriately compensate for the influence of the reflected light.

In the projector according to the aspect of the invention, a characteristic amount acquisition unit that acquires an amount of characteristic of the luminance of the image data may further be included, the correction amount calculation unit may estimate the intensity of the reflected light based on the amount of characteristic that is acquired by the characteristic amount acquisition unit, and may calculate the amount of correction with regard to at least one color, with regard to the image data of a color image.

According to the aspect of the invention with this configuration, it is possible to rapidly estimate the intensity of the reflected light. In addition, it is possible to prevent color balance or white balance in the color image from deviating.

In the projector according to the aspect of the invention, the correction amount calculation unit may calculate the amount of correction with regard to three colors that configure the image data, with regard to the image data of a color image that is configured by three colors of red (R) green (G), and blue (B).

According to the aspect of the invention with this configuration, three colors of R, G, and B in the color image are corrected, and thus, it is possible to prevent color balance or white balance from deviating.

In the projector according to the aspect of the invention, the modulation unit may display an image based on the image data and modulate the light that is emitted from the light source, and the correction unit may correct the luminance of the image that is displayed in the modulation unit depending on the amount of correction.

According to the aspect of the invention with this configuration, the luminance is corrected depending on the amount of correction with regard to the image in which the light of the light source is modulated, and thus, it is possible to appropriately correct the influence of the reflected light.

In the projector according to the aspect of the invention, the light source may include a solid light source, and fluorescent materials that generate light which is converted by excitation light which is emitted from the solid light source, and the converted light of the fluorescent materials is incident on the modulation unit.

According to the aspect of the invention with this configuration, by compensating for the influence of the reflected light of the fluorescent materials, it is possible to prevent the display quality from decreasing due to the reflected light.

In the projector according to the aspect of the invention, the light source may include a first light source and a second light source, at least one of the first and second light sources may be configured by the solid light source, and the fluorescent materials may be included in correspondence with the solid light source.

According to the aspect of the invention with this configuration, in a case where the reflected light of the fluorescent materials influences the balance of the luminance between the light sources, it is possible to improve the display quality by compensating for the influence.

In the projector according to the aspect of the invention, the modulation unit may include a reflection type liquid crystal display panel, and reflects incident light that is emitted from the light source to the light source side.

According to the aspect of the invention with this configuration, by compensating for the influence of the reflected light that is reflected to the light source side by the reflection type liquid crystal display panel, it is possible to prevent the display quality from decreasing due to the reflected light.

Another aspect of the invention is directed to a method of controlling a projector that displays an image based on image data, the method including: modulating light that is emitted from a light source, based on the image data, using a modulation unit; and controlling the modulation unit so as to compensate for an influence of light reflected from the modulation unit to the light source side, based on luminance of the image data.

According to the aspect of the invention, by controlling the modulation unit so as to compensate for the influence of the reflection light, it is possible to correct the projected image. For this reason, it is possible to prevent the display quality from decreasing, without variance of the luminance of the projected image, or deviation of color balance due to the influence of the reflected light.

According to the aspects of the invention, it is possible to prevent the display quality from decreasing due to the influence of the reflected light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawing.

Figure 1:
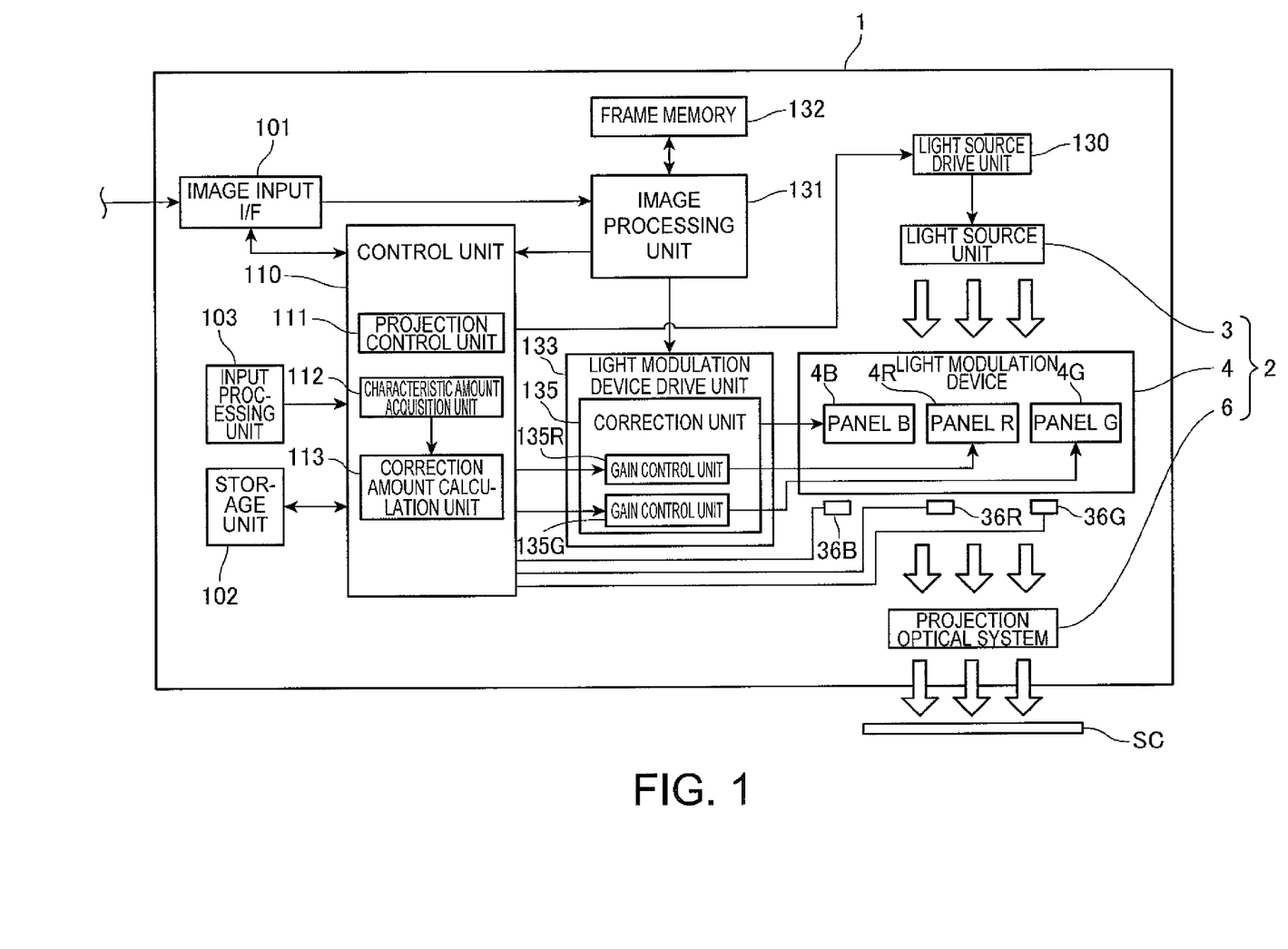
FIG. 1 is a functional block diagram of a projector according to an embodiment.

FIG. 1 is a block diagram illustrating a functional configuration of a projector 1 according to the embodiment. As a display device that projects an image on a screen SC (projection surface), the projector 1 is connected via an image input I/F (interface) 101 to an external image supply device (not illustrated), such as a computer such as a PC or the like, or various image players, and projects the image on the screen SC, based on digital image data that is input to the image input I/F 101.

The projector 1 includes a projection unit 2 that forms an optical image. The projection unit 2 includes a light source unit 3 (light source), a light modulation device (modulation unit) 4, and a projection optical system 6. The light source unit 3 can use a lamp such as a xenon lamp or an ultra high pressure mercury lamp, or solid light source such as a light emitting diode (LED) or a laser light source. In the present embodiment, an example in which a laser light source is included will be described, as will be described later. The light source unit 3 includes a laser light source, and an optical component that generates light of three colors of red (R), green (G), and blue (B) based on the light which is emitted from the laser light source. The laser light source of the light source unit 3 is PWM-controlled by a pulse signal that is input from light source drive unit 130.

The light modulation device 4 modulates the light of three colors of R, G, and B that is emitted from the light source unit 3. The light modulation device 4 includes three liquid crystal light valves in correspondence with the light of three colors of R, G, and B. The liquid crystal light valves according to the present embodiment are configured with reflection type liquid crystal panels 4R, 4G, and 4B.

The projection optical system 6 includes a lens group that synthesizes and condenses the light which is modulated by the light modulation device 4, and projects color image light on the screen SC. The projection optical system 6 includes a focus adjustment mechanism or a zoom mechanism. Focus adjustment or zoom adjustment is performed by an operation of a user. In addition, the projector 1 may include a projection optical system drive unit configured with a motor or the like that drives the focus adjustment mechanism or the zoom mechanism.

Figure 2:
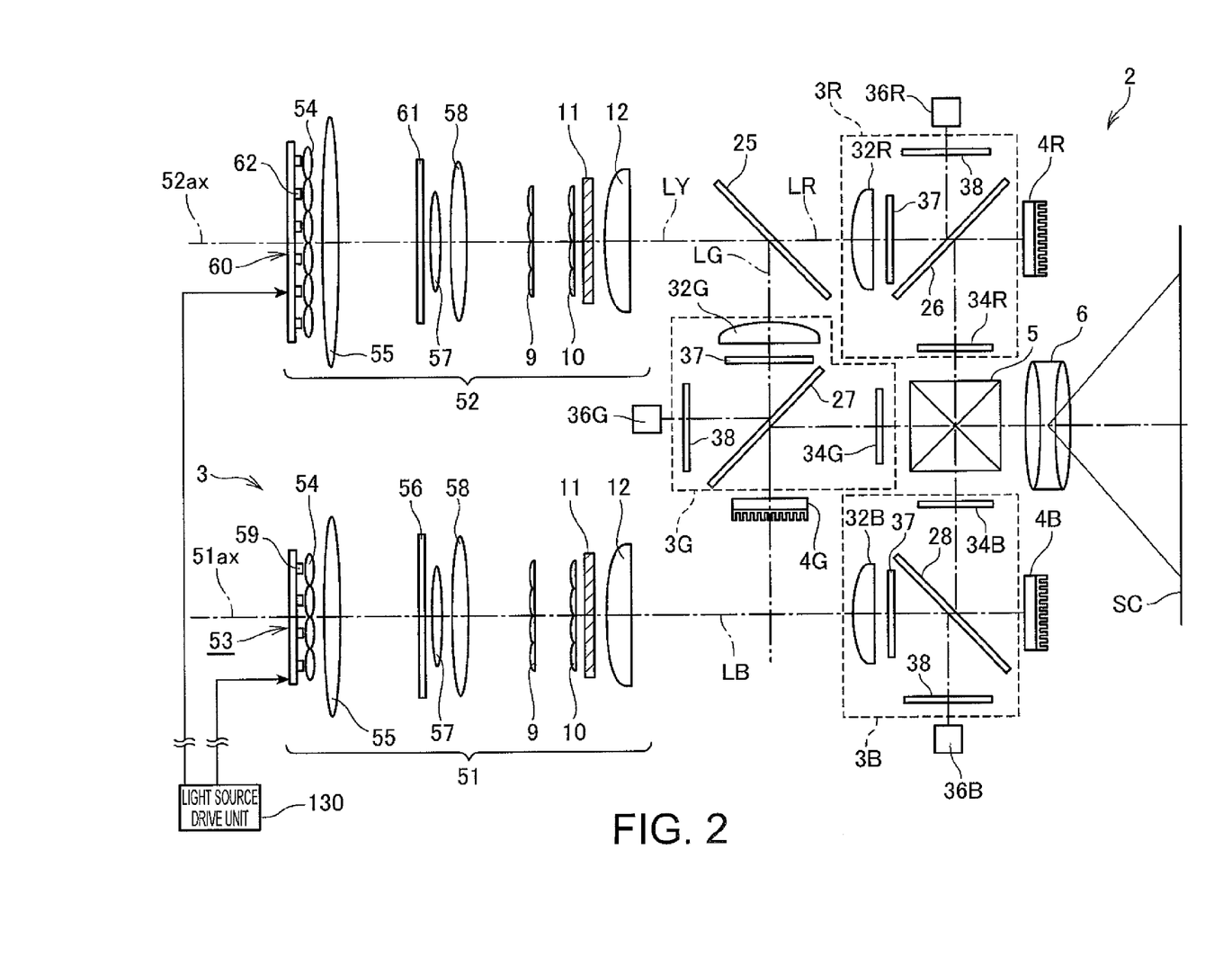
FIG. 2 is a diagram illustrating in detail a configuration of a projection unit.

FIG. 2 is a diagram illustrating in detail a configuration of the projection unit 2.

As illustrated in FIG. 2, the projector 1 includes a blue light illumination device 51, a yellow light illumination device 52, a dichroic mirror 25, and a light guiding optical system. These configure the light source unit 3 illustrated in FIG. 1. It can also be interpreted that the entire light source unit 3 corresponds to the light source unit according to the invention. In addition, it can be said that the blue light illumination device 51 and the yellow light illumination device 52 correspond to the light source unit. Alternatively, it can also be interpreted that a blue laser diode 59 which is included in a blue laser diode array 53, and an excitation laser diode 62 which is included in an excitation laser diode array 60 correspond to the light source unit according to the invention.

The light guiding optical system is configured with a light guiding optical system 3R, a light guiding optical system 3G, and a light guiding optical system 3B corresponding to three colors R, G, and B. The reflection type liquid crystal panels 4R, 4G, and 4B are provided at positions corresponding to the light guiding optical systems 3R, 3G, and 3B. The blue light illumination device 51 mainly emits blue light LB of P-polarized light as an example. The yellow light illumination device 52 mainly emits yellow light LY of P-polarized light as an example.

In addition, the projector 1 includes a cross dichroic prism 5, and the projection optical system 6 is disposed on a side where light is emitted from the cross dichroic prism 5. The cross dichroic prism 5 can also be regarded as a portion of the projection optical system 6.

Furthermore, light sensors 36R, 36G, and 36B are provided at positions corresponding to the light guiding optical systems 3R, 3G, and 3B.

As an example, the dichroic mirror 25 according to the present embodiment permits the red light LR having a longer wavelength than a predetermined reference wavelength, to pass through, in the yellow light LY which is emitted from the yellow light illumination device 52, and reflects the green light LG having a wavelength equal to or shorter than the predetermined reference wavelength.

The light guiding optical system 3R guides the red light of S-polarized light that is reflected by a polarization beam splitter 26, in the red light LR that passes through the dichroic mirror 25, to the light sensor 36R. In addition, the light guiding optical system 3R guides the red light of the P-polarized light that passes through the polarization beam splitter 26, in the red light LR, to the reflection type liquid crystal panel 4R. In addition, the light guiding optical system 3R guides the red light of the S-polarized light that is reflected by the polarization beam splitter 26, in the red light LR that is reflected by the reflection type liquid crystal panel 4R, to the cross dichroic prism 5.

The light guiding optical system 3G guides the green light of the S-polarized light that is reflected by a light polarization beam splitter 27, in the green light LG that is reflected by the dichroic mirror 25, to the light sensor 36G. In addition, the light guiding optical system 3G guides the green light of the P-polarized light that passes through the light polarization beam splitter 27, in the green light LG, to the reflection type liquid crystal panel 4G. In addition, the light guiding optical system 3G guides the green light of the S-polarized light that is reflected by the light polarization beam splitter 27, in the green light LG that is reflected by the reflection type liquid crystal panel 4G, to the cross dichroic prism 5.

The light guiding optical system 3B guides the blue light of the S-polarized light reflected by a light polarization beam splitter 28, in the blue light LB that is emitted from the blue light illumination device 51, to the light sensor 36B. In addition, the light guiding optical system 3B guides the blue light of the P-polarized light that passes through the light polarization beam splitter 28, in the blue light LB, to the reflection type liquid crystal panel 4B. In addition, the light guiding optical system 3B guides the blue light of the S-polarized light that is reflected by the light polarization beam splitter 28, in the blue light LB that is reflected by the reflection type liquid crystal panel 4B, to the cross dichroic prism 5.

The reflection type liquid crystal panels 4R, 4G, and 4B modulate light of colors that is guided by the light guiding optical systems 3R, 3G, and 3B, according to an image signal that is input from a light modulation device drive unit 133 (FIG. 1) which will be described later. The cross dichroic prism 5 synthesizes the red light that is guided by the light guiding optical system 3R, the green light that is guided by the light guiding optical system 3G, and the blue light that is guided by the light guiding optical system 3B. The projection optical system 6 projects the light that is synthesized by the cross dichroic prism 5 onto the screen SC.

The light sensor 36R detects the brightness (light intensity as an example in the present embodiment) of the red light of the S-polarized light that is guided by the light guiding optical system 3R, and outputs a red light intensity signal that indicates light intensity of the detected red light to a control unit 110. The light sensor 36B detects the light intensity of the blue light of the S-polarized light that is guided by the light guiding optical system 3B, and outputs a blue light intensity signal that indicates light intensity of the detected blue light to the control unit 110. The light sensor 36G detects the intensity of the green light of the S-polarized light that is guided by the light guiding optical system 3G, and outputs a green light intensity signal that indicates light intensity of the detected green light to the control unit 110.

The blue light illumination device 51 includes the blue laser diode array 53 as a laser light source. For example, in the blue laser diode array 53, twelve blue laser diodes 59 are arranged in an array shape of 4×3.

In addition, the blue light illumination device 51 includes collimated lenses 54, a condenser lens 55, a diffusion plate 56, a pickup lens 57, a collimating lens 58, a first lens array 9, a second lens array 10, a light polarization conversion element 11, and a superimposing lens 12.

The blue light LB that is emitted from the blue laser diode 59 is collimated by the collimated lenses 54, and thereafter condensed by the condenser lens 55, applied to the diffusion plate 56, and thereby a point light source is formed. Diffused blue light from each point light source on the diffusion plate 56 passes through the pickup lens 57, and is collimated by the collimating lens 58, and thereafter, incident on the first lens array 9.

The first lens array 9 divides an illuminating light beam that is emitted from the collimating lens 58 into a plurality of partial light beams. The partial light beams are incident on the light polarization conversion element 11 via the second lens array 10. The light polarization conversion element 11 emits light in a light polarization direction of each partial light beam that is divided by the first lens array 9 as a linearly polarized light of approximately one type that is aligned to the polarized light direction. For example, the light polarization conversion element 11 permits the light (for example, P-polarized light) polarized in one direction of the illumination light from the blue laser diode 59 to pass through, and reflects the light (for example, S-polarized light) polarized in another direction towards an orthogonal direction to an illumination light axis $51ax$. In this case, the light that passes through the light polarization conversion element 11 is substantially P-polarized light, but all the light is not the P-polarized light, and S-polarized light is mixed. The superimposing lens 12 condenses the plurality of partial light beams that pass through the light polarization conversion element 11, and superimposes the condensed light beams around an image forming area of the reflection type liquid crystal panel 4B. In addition, the superimposing lens 12 may be configured by a combination lens in which a plurality of lenses is combined.

The yellow light illumination device 52 includes the excitation laser diode array 60 as a laser light source. For example, in the excitation laser diode array 60, thirty excitation laser diodes 62 are arranged in an array shape of 6×5.

The excitation laser diode 62 emits ultraviolet light or blue light, as excitation light for exciting fluorescent materials.

In addition, the yellow light illumination device 52 includes collimated lenses 54, a condenser lens 55, a fluorescent material substrate 61, a pickup lens 57, a collimating lens 58, a first lens array 9, a second lens array 10, a light polarization conversion element 11, and a superimposing lens 12.

The collimated lenses 54 are provided so as to correspond to each excitation laser diode 62.

The first lens array 9, the second lens array 10, the light polarization conversion element 11, and the superimposing lens 12 in the yellow light illumination device 52 have the same configuration as the first lens array 9, the second lens array 10, the light polarization conversion element 11, and the superimposing lens 12 in the blue light illumination device 51, respectively. However, the yellow light illumination device 52 is different from the blue light illumination device 51 in that the illumination light axis 51ax of the blue light illumination device 51 is changed to the illumination light axis 52ax.

The fluorescent material substrate 61 has a configuration in which a fluorescent material layer that receives the excitation light of ultraviolet light, the blue light, or the like and emits the yellow light is formed on the substrate. The excitation light that is emitted from the excitation laser diode 62 is collimated by the collimated lenses 54, condensed by the condenser lens 55, and applied to the fluorescent material substrate 61. As a result, the point light source is formed. The yellow light LY that is emitted from the point light source on the fluorescent material substrate 61 passes through the pickup lens 57, is collimated by the collimating lens 58, and thereafter is incident on the first lens array 9.

The blue light LB that is condensed by the superimposing lens 12 is converted into a substantially parallel light beam by a condenser lens 32B of the light guiding optical system 3B, and is incident on the light polarization beam splitter 28 via a first iris 37. The light polarization beam splitter 28 according to the present embodiment permits the P-polarized light to pass through, and reflects the S-polarized light, as an example. The illumination light beam of the blue light illumination device 51 is aligned with the linearly polarized light (for example, P-polarized light) of approximately one type by the light polarization conversion element 11. For this reason, the light that passes through the condenser lens 32B passes through the light polarization beam splitter 28, and is incident on the blue light reflection type liquid crystal panel 4B. In addition, the other condenser lenses 32R and 32G are also configured in the same manner as the condenser lens 32B.

The light beam of blue light of S-polarized light that is reflected by the light polarization beam splitter 28 is narrowed by a second iris 38, and is guided to the light sensor 36B. In addition, the light polarization beam splitter 28 reflects the blue light of the S-polarized light, in the blue light that is reflected by the reflection type liquid crystal panel 4B, and permits the blue light of the P-polarized light to pass through. As a result, the blue light of the S-polarized light that is reflected by the light polarization beam splitter 28 is guided to a light polarization plate 34B. The light polarization plate 34B permits only the light polarized in a predetermined direction to pass through, in the guided blue light. As a result, the blue light polarized in the predetermined direction is guided to the cross dichroic prism 5.

In addition, the other light polarization beam splitters 26 and 27 are also configured in the same manner as the above-described light polarization beam splitter 28.

The condenser lens 32R of the light guiding optical system 3R converts each partial light beam of the red light LR that passes through the dichroic mirror 25 into a substantially parallel light beam with respect to each main light ray. The first iris 37 narrows the substantially parallel light beam that is converted by the condenser lens 32R. As a result, the red light LR that passes through the dichroic mirror 25 is incident on the light polarization beam splitter 26 via the condenser lens 32R and the first iris 37. The light polarization beam splitter 26 has a function that permits the P-polarized light to pass through and reflects the S-polarized light, as an example. The illumination light beam from the yellow light illumination device 52 is aligned to the linearly polarized light (for example, P-polarized light) of an approximately one type that is substantially aligned to the polarized light direction by the light polarization conversion element 11. For this reason, the light that passes through the condenser lens 32R passes through the light polarization beam splitter 26 and is incident on the red light reflection type liquid crystal panel 4R. In addition, the light beam of the blue light of the S-polarized light that is reflected by the light polarization beam splitter 26 is narrowed by the second iris 38, and is guided to the light sensor 36R.

The light polarization beam splitter 26 reflects the red light of the S-polarized light and permits the red light of the P-polarized light to pass through, in the red light that is reflected by the reflection type liquid crystal panel 4R. As a result, the red light of the P-polarized light that is reflected by the light polarization beam splitter 26 is guided to the light polarization plate 34R. The light polarization plate 34R permits only the light that is polarized in a predetermined direction to pass through, in the guided red light. As a result, the red light that is polarized in the predetermined direction is guided to the cross dichroic prism 5.

The light guiding optical system 3G includes the condenser lens 32G, the first iris 37, the light polarization beam splitter 27, the second iris 38, and a light polarization plate 34G.

The condenser lens 32G converts each partial light beam of the green light LG that is reflected by the dichroic mirror 25 into a substantially parallel light beam with respect to each main light ray. The first iris 37 narrows the substantially parallel light beam that is converted by the condenser lens 32G. As a result, the green light LG that is reflected by the dichroic mirror 25 is incident on the light polarization beam splitter 27 via the condenser lens 32G and the first iris 37. The light polarization beam splitter 27 has a function that permits the P-polarized light to pass through and reflects the S-polarized light, as an example. The illumination light beam from the yellow light illumination device 52 is aligned to the linearly polarized light (for example, P-polarized light) of an approximately one type that is substantially aligned to the polarized light direction by the light polarization conversion element 11. For this reason, the light that passes through the condenser lens 32G passes through the light polarization beam splitter 27 and is incident on the green light reflection type liquid crystal panel 4G. The light beam of the green light of the S-polarized light that is reflected by the light polarization beam splitter 27 is narrowed by the second iris 38, and is guided to the light sensor 36G.

In addition, the light polarization beam splitter 27 reflects the green light of the S-polarized light and permits the green light of the P-polarized light to pass through, in the green light that is reflected by the reflection type liquid crystal panel 4G. As a result, the green light of the S-polarized light that is reflected by the light polarization beam splitter 26 is guided to the light polarization plate 34G. The light polarization plate 34G permits only the light that is polarized in a predetermined direction to pass through, in the guided green light. As a result, the green light that is polarized in the predetermined direction is guided to the cross dichroic prism 5.

The cross dichroic prism 5 is an optical element that synthesizes the modulated optical image with light of each color which is emitted from the light polarization plate 34R, the light polarization plate 34G, and the light polarization plate 34B, and forms a color image. The cross dichroic prism 5 forms a substantially rectangular shape, which is configured by bonding four right angle prisms, in a planar view, and a dielectric multilayer film is formed on an interface of a substantially X-shape that is formed by bonding the right angle prisms. The dielectric multilayer film that is formed on one interface of the substantially X-shape reflects the blue light LB, and the dielectric multilayer film that is formed on the other interface reflects the red light LR. The blue light LB and the red light LR are bent by the dielectric multilayer film, aligned to a travelling direction of the green light LG that passes through the cross dichroic prism 5, and thereby the light of three colors is synthesized.

The color image that is formed by the light which is emitted from the cross dichroic prism 5 is enlarged by the projection optical system 6 to be projected, and the image is formed on the screen SC.

A body of the projector 1 includes an image processing system that controls an operation of the projector 1 and electrically processes an image signal. The image processing system includes the control unit 110, the image input I/F 101, a storage unit 102, an input processing unit 103, the light source drive unit 130, an image processing unit 131, a frame memory 132, and the light modulation device drive unit 133.

The image input I/F 101 receives an input of digital image data from an external image supply device, and outputs the input image data to the image processing unit 131, as described above. The image input I/F 101 includes an interface that is compliant with various standards for transmitting the image data. The interface may be an interface of a communication system, and may be an interface of an image and video system. Specifically, the interface is a wired connection interface such as a USB, IEEE1394 or a wired LAN, or a wireless communication interface such as Bluetooth (registered trademark) or a wireless LAN, or the like. In addition, as the image input I/F 101, an interface, such as HDMI (registered trademark), Display Port (registered trademark), CoaXPress, or the like can be used. In addition, the image input I/F 101 may have a plurality of input systems of the image data. The image input I/F 101 selects by switching the input systems according to a control of the control unit 110, and outputs the image data of the selected input system. The image data that is input by the image input I/F 101 may be moving image (video) data and may be still image data.

In addition, the image input I/F 101 may have a configuration that can input an analog image signal. In this case, the image input I/F 101 may have an analog image signal A/D (analog/digital) conversion function.

The light source drive unit 130 outputs a pulse signal with respect to the blue laser diode array 53 and the excitation laser diode array 60 of the light source unit 3, according to the control of the control unit 110. The light source drive unit 130 adjusts a pulse width of the pulse signal that is output, and a duty ratio between an ON period (High) and an OFF period (Low), thereby PWM-controlling each of the blue laser diode 59 and the excitation laser diode 62.

The image processing unit 131 processes the image data that is input from the image input I/F 101, according to the control of the control unit 110, and outputs the image signal to the light modulation device drive unit 133.

The processing that is performed by the image processing unit 131 is determination processing of a 3D image and a 2D image, resolution conversion processing, frame rate conversion processing, 3D image conversion processing, distortion correction processing, zoom processing, color tone correction processing, luminance correction processing, or the like, and it is also possible to be performed by combining a plurality of processing items among these. In addition, the image processing unit 131 outputs the determination result of the 3D image and the 2D image, the image data that is input from the image input I/F 101, or the like to the control unit 110. Using this processing, the image processing unit 131 may determine by analyzing the data that is added to the image data which is input from the image input I/F 101. In addition, the image processing unit 131 may analyze the frame of the image data, thereby determining whether or not the data is a 3D image data of a type, such as side-by-side, top-and-bottom, line-by-line, or frame packing.

The determination processing of the 3D image and the 2D image is processing of determining whether the image data that is input from the image input I/F 101 is a 3D image or a 2D image.

The resolution conversion processing is processing of converting by matching the resolution of the input image data with the resolution that is designated by the control unit 110, for example, a display resolution of the reflection type liquid crystal panels 4R, 4G, and 4B, by means of the image processing unit 131. The frame rate conversion processing is processing of converting a frame rate of the input image data into a frame rate that is designated by the control unit 110, by means of the image processing unit 131. For example, in a case where an overdrive display is performed by the reflection type liquid crystal panels 4R, 4G, and 4B, the processing of generating an intermediate frame from the input image data, or the like is included. This processing may include the processing of converting or generating a vertical synchronization signal.

The 3D image conversion processing is performed in a case where it is determined that the input image data is 3D image data. Using the 3D image conversion processing, the image processing unit 131 generates a frame that is appropriate for the display resolution of the reflection type liquid crystal panels 4R, 4G, and 4B, together with the input image data of a type, such as side-by-side, top-and-bottom, line-by-line, or frame packing. For example, the image processing unit 131 generates the image data of a frame sequential type in which a frame for the left eye and a frame for the right eye are alternately output by being time-shared. By this processing, the image processing unit 131 may perform processing of generating an intermediate frame as necessary, and when the image signal is output to the light modulation device drive unit 133, may output a 3D identification signal (L/R signal) that indicates whether the image signal being output is a frame for the left eye or a frame for the right eye.

The distortion correction processing is processing that converts the image data according to a correction parameter that is input from the control unit 110, and corrects trapezoidal distortion or pincushion distortion of the projected image on the screen SC. The zoom processing is processing that in a case where zooming is instructed by a remote controller or an operation of an operation panel, the image is enlarged or contracted. The color tone correction processing is processing of changing the color tone of the image data, and the data of various pixels that are included in the image data is changed to match the color tone that is designated by the control unit 110. By this processing, the projector 1 can realize the color tone that is appropriate for watching a movie, the color tone that is appropriate for a case where the screen SC is provided in a bright environment, the color tone that is appropriate for a case where an image is projected on a screen SC that is non-white such as a blackboard, or the like. In addition to the color tone correction processing, contrast adjustment or the like may be formed. The luminance correction processing is processing of correcting the luminance of the image data, in correspondence with a light emitting state of the light source unit 3, or the brightness or the like of the environment in which the projector 1 is provided.

The detail of the above-described processing that is performed by the image processing unit 131, the parameter, and the timing of start/end of the process is controlled by the control unit 110.

The image processing unit 131 includes the frame memory 132. The image processing unit 131 develops the image data that is input from the image input I/F 101 into the frame memory 132, and performs the above-described various processing items with respect to the developed image data. The image processing unit 131 reads post-processing image data from the frame memory 132, and outputs the read data to the light modulation device drive unit 133.

The light modulation device drive unit 133 is connected to the reflection type liquid crystal panels 4R, 4G, and 4B of the light modulation device 4. The light modulation device drive unit 133 drives the reflection type liquid crystal panels 4R, 4G, and 4B, based on the image signal that is input from the image processing unit 131, and draws the images on each liquid crystal panel.

In addition, the light modulation device drive unit 133 includes a correction unit 135. The correction unit 135 performs processing of expanding a gradation range of the image signal, or processing of compressing the gradation range of the image signal, and thus, corrects the luminance of the image that is drawn on the reflection type liquid crystal panels 4R, 4B, and 4G. The correction unit 135 includes a gain control unit 135R that corrects the luminance of the reflection type liquid crystal panel 4R, and a gain control unit 135G that corrects the luminance of reflection type liquid crystal panel 4G. The gain control units 135R and 135G expand or compress the gradation ranges of an R image signal and a G image signal that are input from the image processing unit 131, according to an amount of correction.

The processing that the correction unit 135 performs aims to perform adjustment called color balance or white balance of a projected image of the projection unit 2. If variation of light intensity of light of colors of R, G, and B that is modulated by the three reflection type liquid crystal panels 4R, 4G, and 4B occurs in the projector 1, a color tone of the projected image on the screen SC is deviated from an original color tone, and thereby color reproducibility is decreased. The correction unit 135 changes the luminance of the image that is drawn on the reflection type liquid crystal panels 4R, 4G, and 4B, thereby correcting the variation of the light intensity of the light of colors of R, G, and B. Since the three reflection type liquid crystal panels 4R, 4G, and 4B are used in the present embodiment, the luminance of at least two reflection type liquid crystal panels may be corrected.

The control unit 110 is connected to the storage unit 102 and the input processing unit 103.

The storage unit 102 stores in a non-volatile manner a program that is executed by a CPU (not illustrated) which is included in the control unit 110, data that is processed by the control unit 110, or the like. For example, the storage unit 102 stores the set values of various processing items that are performed by the image processing unit 131, a table that is referenced by the control unit 110 or the image processing unit 131, or the like. In addition, the image data is stored in the storage unit 102, and the image data may be read by the control unit 110 and then may be projected on the screen SC.

The input processing unit 103 receives and decodes a wireless signal that is transmitted from a remote controller (not illustrated) which operates the projector 1, and detects an operation of the remote controller. In addition, the input processing unit 103 detects an operation of buttons in the operation panel (not illustrated) that are provided in a body of the projector 1. The input processing unit 103 generates operation data that indicates the operation of the remote controller or the operation panel, and outputs the generated data to the control unit 110. In addition, the input processing unit 103 controls a lighting state of an indicator lamp of the operation panel (not illustrated) according to an operation state or a setting state of the projector 1, and according to the control of the control unit 110.

The control unit 110 includes a projection control unit 111, a characteristic amount acquisition unit 112, and a correction amount calculation unit 113, and controls the operation of the projector 1.

The projection control unit 111 controls an operation of projecting the image, based on the operation data that is input from the input processing unit 103.

The projection control unit 111 controls the light source drive unit 130 along with the start and end of the projection, and thereby the light source unit 3 is turned on or off. In addition, the projection control unit 111 acquires the image data that is output from the image processing unit 131 to the light modulation device drive unit 133, and controls the light source drive unit 130 in such a manner that the light source unit 3 emits light according to the light intensity appropriate for the projection of the image data.

In addition, the projection control unit 111 instructs performing of the above-described various processing with respect to the image processing unit 131, based on the image data that is input from the image processing unit 131 or the operation data that is input from the input processing unit 103, and generates parameters required for the processing to output. In addition, the projection control unit 111 controls the image input I/F 101 and instructs switching of the input system.

In addition, the control unit 110 is connected to the light sensors 36R, 36G, and 36B. The control unit 110 may control the light source drive unit 130 based on the light intensity signal that is input from the light sensors 36R, 36G, and 36B, thereby adjusting the luminance of the blue laser diode array 53 and the excitation laser diode array 60.

However, in the light source unit 3, the light intensity of the light of three colors of R, G, and B that is applied to the reflection type liquid crystal panels 4R, 4G, and 4B can be influenced by the reflected light. Here, the reflected light that influences is light which is reflected by the reflection type liquid crystal panels 4R, 4G, and 4B, passes through the dichroic mirror, and goes towards the laser light source side.

That is, as, illustrated in FIG. 2, the blue light of P-polarized light in the blue light that is reflected by the reflection type liquid crystal panel 4B passes through the light polarization beam splitter 28, and is incident on the blue laser diode array 53 side. In addition, the red light of P-polarized light reflected by the reflection type liquid crystal panel 4R passes through the light polarization beam splitter 26, and goes towards the dichroic mirror 25. The green light of P-polarized light reflected by the reflection type liquid crystal panel 4G passes through the light polarization beam splitter 27, and goes towards the dichroic mirror 25. The reflected light is light that is not contribute to the image display, and the darker the image to be displayed is, the larger the light intensity of the reflected light is. For this reason, if the rate of dark pixels of the image that is displayed on the reflection type liquid crystal panels 4R, 4G, and 4B is high, the light intensity of the reflected light becomes strong.

The red light and green light of the P-polarized light that are reflected by the reflection type liquid crystal panels 4R, 4G, and 4B is incident on the yellow light illumination device 52, and reaches a fluorescent material substrate 61. Here, a reflection rate of a surface of the fluorescent material substrate 61 is high, and thus the light that is reflected by the reflection type liquid crystal panels 4R and 4G and reaches the fluorescent material substrate 61 is reflected by the fluorescent material substrate 61 and goes again towards the dichroic mirror 25. The light is superimposed with the light that is emitted from the excitation laser diode 62, divided by the dichroic mirror 25, and incident on the light guiding optical systems 3R and 3G. In addition, the red light and the green light of P-polarized light that are reflected by the reflection type liquid crystal panels 4R and 4G are reflected by an optical component other than the fluorescent material substrate 61 that is on a light path of the projection unit 2, and the reflected light is incident on the light guiding optical systems 3R and 3G. In this way, in the light that is emitted from the yellow light illumination device 52, the reflected light of a component of the P-polarized light that is reflected by the reflection type liquid crystal panels 4R and 4G is included. Thus, the light intensity that is emitted from the yellow light illumination device 52 includes an influence of the reflected light that is reflected by the reflection type liquid crystal panels 4R and 4G, in addition to the emitted light intensity of the excitation laser diode 62.

The reflection type liquid crystal panel 4B has the same effects as described above, with respect to the reflected light. The blue light of the P-polarized light that is reflected by the reflection type liquid crystal panel 4B passes through the light polarization beam splitter 28 and is incident on the blue light illumination device 51. The blue light is reflected by a surface of an optical element that is included in the blue light illumination device 51, and goes again towards the light guiding optical system 3B. Thus, the light intensity that is emitted from the blue light illumination device 51 includes the influence of the reflected light that is reflected by the reflection type liquid crystal panel 4B, in addition to the light intensity of the blue laser diode 59.

Furthermore, the yellow light illumination device includes a fluorescent material substrate 61 with a particularly high reflection rate, and in contrast to this, the reflection rate of the optical element of the blue light illumination device 51 is not as high as that of the fluorescent material substrate 61. For this reason, the degree of the influence of the reflected light that is included in the light of the blue light illumination device 51 is different from the degree of the influence of the reflected light that is included in the light of the blue light illumination device 52.

In this way, the light that is emitted from the blue light illumination device 51 and the yellow light illumination device 52 includes the influence of the reflected light that is reflected by the reflected type liquid crystal panels 4R, 4G, and 4B once, and the light intensity going towards the screen SC from the reflected type liquid crystal panels 4R and 4G increases due to the influence of the reflection light. Due to the influence, there is a possibility that unbalance of the light intensity of the reflection light of the reflection type liquid crystal panels 4R, 4G, and 4B occurs, and deviation of the color balance occurs.

Thus, by adjusting the luminance of the image that is displayed on the reflection type liquid crystal panels 4R and 4G by the above-described correction unit 135, the projector 1 adjusts the light intensity going towards cross dichroic prism 5 from the reflection type liquid crystal panels 4R, 4G, and 4B. As a result, the deviation of the color balance of the projected image of the screen SC is corrected. Specifically, the light intensity going towards the prism from the reflection type liquid crystal panels 4R and 4G increases by intensity of the reflected light described above, and correspondently to this, the luminance of the image that is displayed on the reflection type liquid crystal panels 4R and 4G decreases. As a result, the light intensity that is incident on the prism from the reflection type liquid crystal panels 4R and 4G becomes the light intensity of the reflected light of the reflection type liquid crystal panel 4B, and the light intensity is balanced.

For this reason, the control unit 110 calculates an amount of correction that the correction unit 135 uses to correct the luminance, using the characteristic amount acquisition unit 112 and the correction amount calculation unit 113. That is, the characteristic amount acquisition unit 112 obtains the amount of characteristic of the image data that is output from the image processing unit 131 to the light modulation device drive unit 133. The correction amount calculation unit 113 calculates the amount of correction that corrects the influence of the reflected light, along with the amount of characteristic obtained by the characteristic amount acquisition unit 112, and outputs the calculated amount of correction to the correction unit 135. As a result, the correction unit 135 can correct the image so as to compensate for the influence of the reflected light.

A function thereof will be described with reference to FIGS. 3 and 4.

Figure 3:
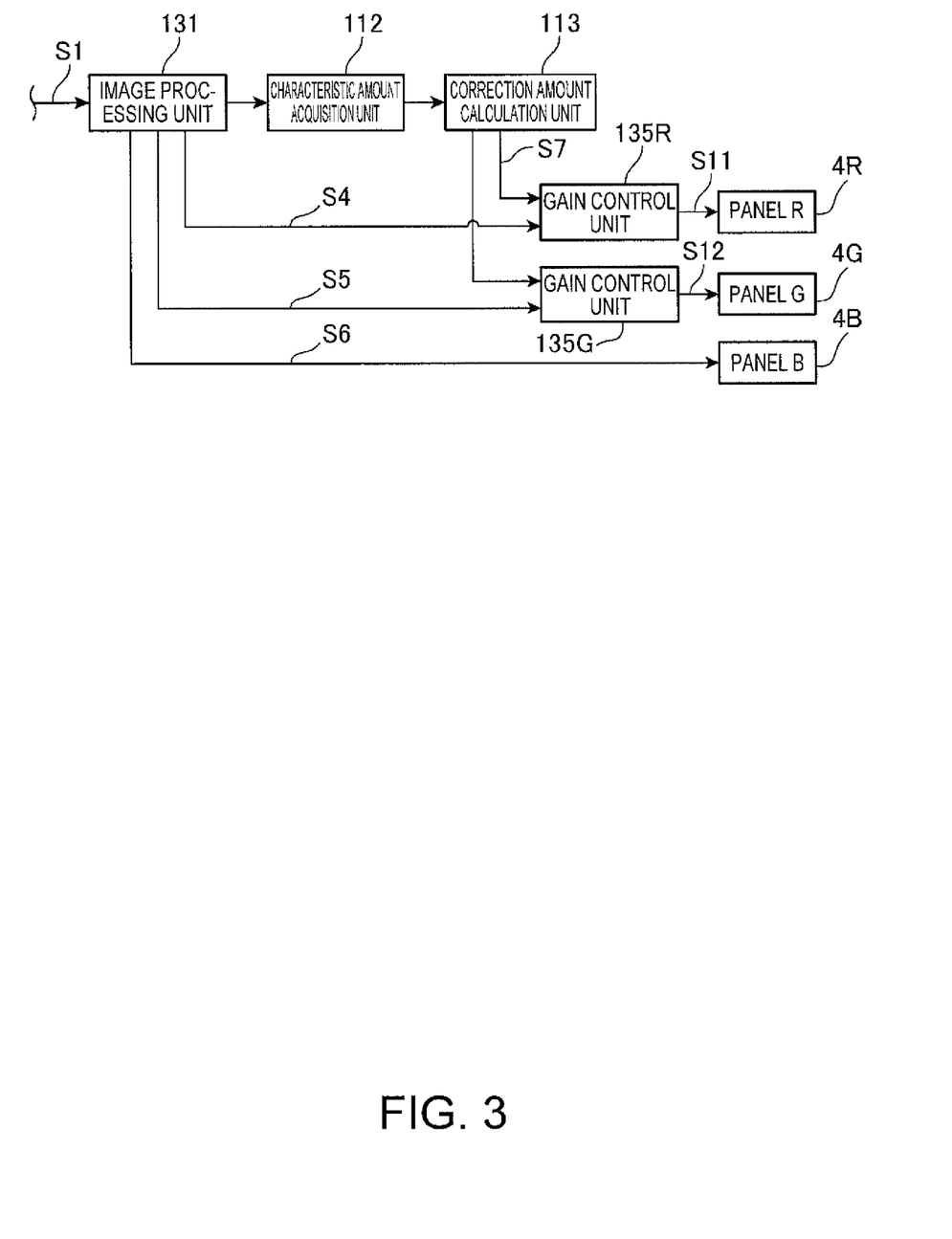
FIG. 3 is a diagram schematically illustrating a function of each unit of the projector.

FIG. 3 is a diagram schematically illustrating a function of correcting images of each unit of the projector 1 illustrated in FIG. 1.

As illustrated in FIG. 3, the image data S1 is input to the image processing unit 131 from the image input I/F 101, and the image processing unit 131 outputs the image data S1 to the characteristic amount acquisition unit 112. In addition, the image processing unit 131 processes the image data S1 and outputs an R image signal S4, a G image signal S5, and a B image signal S6.

The characteristic amount acquisition unit 112 acquires the amount of characteristic based on the image data S1, and outputs the acquired amount of characteristic S2 to the correction amount calculation unit 113. Based on the amount of characteristic S2 that is input from the characteristic amount acquisition unit 112, the correction amount calculation unit 113 generates an amount of correction S7 corresponding to the red (color R), and an amount of correction S8 corresponding to the green (color G), and outputs the amounts of correction to the gain control units 135R and 135G.

The gain control unit 135R corrects the R image signal S4 based on the amount of correction S7. For example, the gain control unit 135R performs processing of expanding or compressing the gradation range of the R image signal S4 using a gain that is the designated by the amount of correction S7, and outputs the post-processing R image signal S11 to the reflection type liquid crystal panel 4R. In the same manner as above, the gain control unit 135G corrects the G image signal S5 based on the amount of correction S8, and outputs the post-processing G image signal S12 to the reflection type liquid crystal panel 4G. In addition, the B image signal S6 is input to the reflection type liquid crystal panel 4B from the image processing unit 131.

In this way, by correcting the image signal that is input to the reflection type liquid crystal panels 4R and 4G, among the reflection type liquid crystal panels 4R, 4G, and 4B, it is possible to adjust the balance of the luminance of the image that is displayed by the reflection type liquid crystal panels 4R, 4G, and 4B.

Figure 4:
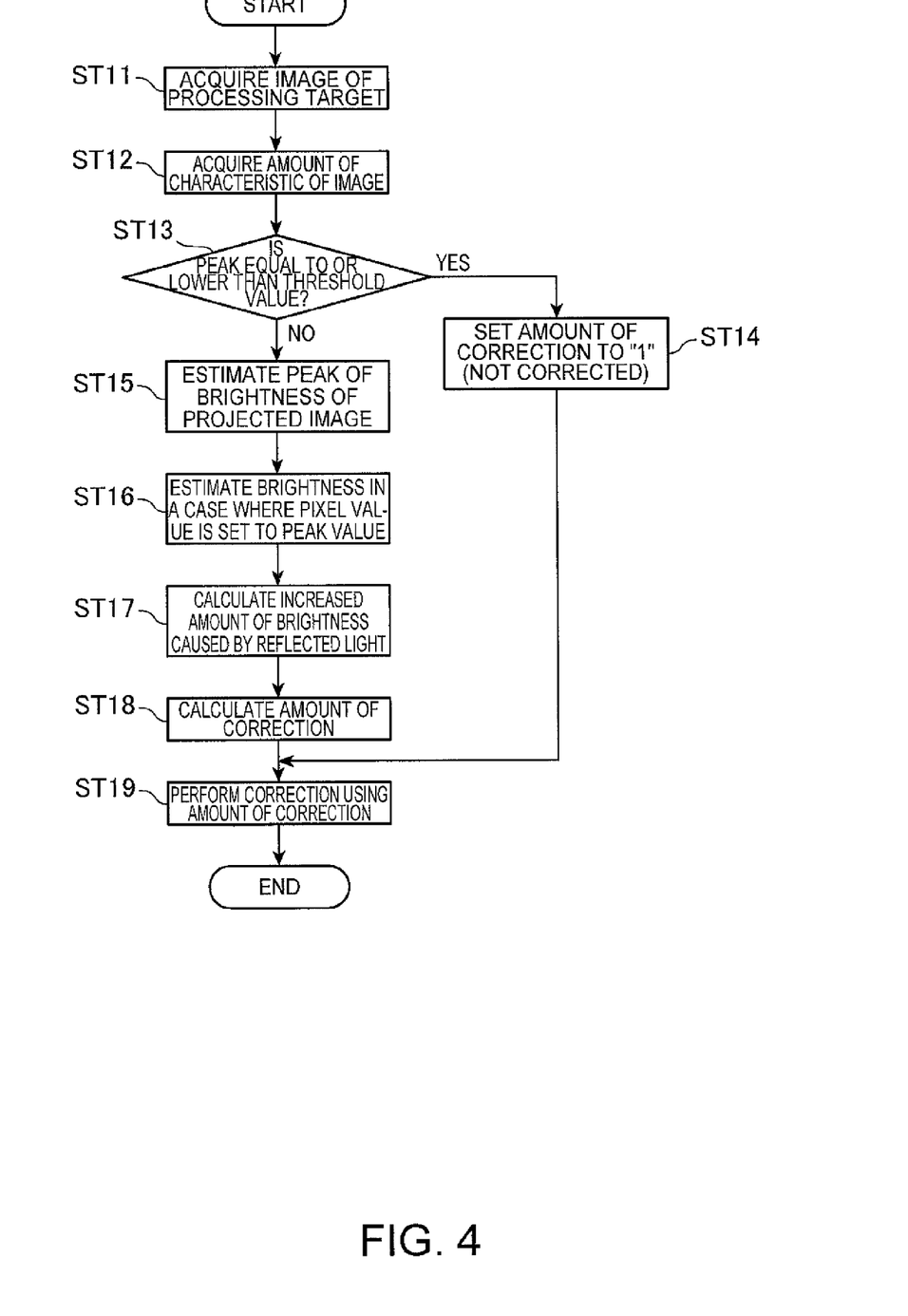
FIG. 4 is a flowchart illustrating an operation of the projector.

FIG. 4 is a flowchart illustrating an operation of the projector 1, and in detail, illustrates an operation of correcting the luminance using the control unit 110 and the correction unit 135.

The characteristic amount acquisition unit 112 acquires one frame of the image data as a processing target frame (step ST11). The characteristic amount acquisition unit 112 divides the acquired image data of one frame into each color component of R, G, and B, and acquires an amount of image characteristic of each color (step ST12). For example, the amount of characteristic that is acquired by the characteristic amount acquisition unit 112 in step ST12 includes the following values with respect to each color of R, G, and B.

1. Peak value of luminance
2. Average picture level (APL)
3. Luminance histogram The amount of characteristic that is acquired by the characteristic amount acquisition unit 112 may include a value other than the above-described items 1 to 3. In addition, the amount of characteristic may include only the peak value of luminance and the APL, and may include only the luminance histogram.

As a method of acquiring the above-described amount of characteristic using the characteristic amount acquisition unit 112, a known method can be used.

Here, the correction amount calculation unit 113 sets the color R or the color G, among the amount of characteristic that is acquired by the characteristic amount acquisition unit 112 as the processing target, and performs the following processing.

A case where the color R is processed as a processing target will be first described.

The correction amount calculation unit 113 determines whether or not a peak value of the color R that is included in the amount of characteristic is equal to or less than a threshold value that is set in advance (step ST13). The threshold value is stored in, for example, the storage unit 102. In a case where the peak value of the color R is equal to or lower than the threshold value (step ST13; Yes), the correction amount calculation unit 113 sets an amount of correction D of the color R to "1" (step ST14). The amount of correction D is a gain coefficient of the gain control units 135R and 135G, and the amount of correction of the color R is input to the gain control unit 135R. If the amount of correction D=1, it means that the gain is not adjusted by the gain control unit 135R. The correction amount calculation unit 113 sets the amount of correction D of the gain control unit 135R to "1", and thereafter proceeds to step ST19 that will be described later.

In a case where the peak value of the color R is greater than the threshold value (step ST13; No), the correction amount calculation unit 113 performs processing of calculating the amount of correction. The present embodiment exemplifies a case where a color depth of the image data is 10 bits. In addition, the peak value indicates a peak value of a processing target color between the color R and the color G, and Ref indicates a reflection rate of the optical system of the projector 1. As a value of Ref, a value that is actually measured in specific conditions can be used. γ indicates a gamma value of the optical system of the projector 1. The optical system may include optical elements or optical components that are included in the blue light illumination device 51 and the yellow light illumination device 52 which are illustrated in FIG. 2, may include the light guiding optical systems 3R, 3G, and 3B, and may include the cross dichroic prism 5 and the projection optical system 6. In addition, as an optical system in a broad sense, the optical system may include the reflection type liquid crystal panels 4R, 4G, and 4B.

In addition, the values of Ref and γ may be prepared for each of the color R and the color G. In this case, the values of Ref and γ corresponding to the color R may be a value that is obtained with regard to the optical system which configures a light path of the light of the color R, and the values of Ref and γ corresponding to the color G may be a value that is obtained with regard to the optical system which configures a light path of the light of the color G. The values of Ref and γ are stored in advance in, for example, the storage unit 102.

The correction amount calculation unit 113 estimates a peak of the brightness of the projected image (step ST15). A peak A of the brightness of the color R can be obtained by, for example, the following formula (1), using a value of APL of the color R that is acquired by the characteristic amount acquisition unit 112.

$$A = \left\{1 + \left(1 - \frac{APL}{1023}\right)Ref\right\}\left(\frac{\text{Peak}}{1023}\right)^\gamma \quad (1)$$

Even when regarding all of R, G, and B, there are many dark pixels (for example, black pixels) in an image that is displayed by the reflection type liquid crystal panels 4R, 4G, and 4B, and the light intensity that is reflected to the blue light illumination device 51 side and the yellow light illumination device 52 side, in the reflected light of the reflection type liquid crystal panels 4R, 4G, and 4B increases. That is, with regard to the color R, the more the dark pixels of the reflection type liquid crystal panel 4R there are, the stronger the light intensity of the reflected light is. The above-described formula (1) represents that the lower the APL is, the stronger the light intensity of the reflected light is, and the greater the brightness in a plane of the projected image is.

Subsequently, the correction amount calculation unit 113 estimates the brightness B of the projected image in a case where a Raster image in which an image value is a peak value is displayed on the reflection type liquid crystal panel 4R (step ST16). The brightness B can be obtained by, for example, the following formula (2).

$$B = \left\{1 + \left(1 - \frac{\text{Peak}}{1023}\right)Ref\right\}\left(\frac{\text{Peak}}{1023}\right)^\gamma \quad (2)$$

The above-described formula (2) represents that the lower the peak value is, the stronger the light intensity of the reflected light is, and the greater the entire brightness of the projected image is.

Based on the peak value A and the brightness B that are obtained in steps ST15 and ST16, the correction amount calculation unit 113 calculates an increased amount C of the brightness caused by the reflected light with regard to the color R (step ST17). The increased amount C of the brightness can be obtained by, for example, the following formula (3).

$$C = B - A \quad (3)$$

The correction amount calculation unit 113 obtains an amount of correction D based on the increased amount C of the brightness (step ST18). The amount of correction D represents an amount of correction that decreases the luminance of an image in such a manner that the increased amount C of the brightness is cancelled. The amount of correction D can be obtained by, for example, the following formula (4).

$$D = \frac{1}{\left(1 + \frac{C}{B}\right)^{\frac{1}{\gamma}}} \quad (4)$$

If the brightness B and the increased amount C of brightness in the above-described formula (4) is developed using the above-described formulas (1) to (3), the result becomes the following formula (5).

$$D = 1 - \left\{1 - \frac{1}{(1 + Ref)^{\frac{1}{\gamma}}}\right\} \frac{\text{Peak} - \text{APL}}{1023} \quad (5)$$

In a case where D=1, image correction is not performed, and in a case where D>1, the correction in which the image luminance increases is performed. In the present embodiment, the image luminance is decreased so as to cancel the influence of the reflected light, and thus the amount of correction D that is obtained by the above-described formulas (4) and (5) is D≤1.

The correction amount calculation unit 113 performs processing of the above-described steps ST14, and ST15 to ST18, with regard to both of the color R and the color G, and thereafter, proceeds to step ST19.

In step ST19, the correction amount calculation unit 113 performs the correction by outputting the amount of correction D to the correction unit 135. If the pixel values of the pre-correction image are referred to as (R, G, B), the image values of post-correction are (R', G', B'), and the amount of correction D of the color R is referred to as $D_R$, the amount of correction D of the color G is referred to as $D_G$, a relation of the following formula (6) is obtained.

$$R' = D_R R$$

$$G' = D_G G$$

$$B' = B \quad (6)$$

According to the above-described processing, the corrected images (R', G', B') are displayed by the reflection type liquid crystal panels 4R, 4G, and 4B.

In addition, in a case where the peak value is equal to or lower than the threshold value with regard to the colors R and G, the amount of correction D is set to D=1. As described above, as the peak value is small, the intensity of the reflected light is large, but if the peak value is small, the intensity of the light that is reflected from the reflection type liquid crystal panels 4R, 4G, and 4B to the cross dichroic prism 5 is small. Thus, if the correction unit 135 performs the correction, in a case of a small peak value, an excessive correction is performed, and there is a possibility that it is difficult for the effects of color balance adjustment to occur. In the correction amount calculation unit 113, as described in step ST14, in a case where the peak value is equal to or smaller than the threshold value, the amount of correction is set to D=1, and thus the correction is not performed, and thereby the excessive correction can be prevented.

As described above, the projector 1 according to the embodiment to which the present invention is applied includes the light source unit 3, and the light modulation device 4 that modulates the light which is emitted from the light source unit 3 based on the image data. The projector 1 controls the light modulation device 4 so as to compensate for the influence of the reflected light from the light modulation device 4 to the light source unit 3 side, using the correction amount calculation unit 113 and the correction unit 135, based on the luminance of the image data. As a result, it is possible to correct the projected image so as to compensate for the influence of the reflection light. For this reason, it is possible to prevent the display quality from decreasing, without variance of the luminance of the projected image, or deviation of color balance due to the influence of the reflected light.

Here, the projector 1 controls the light modulation device 4 so as to suppress an increase of the luminance occurring due to the influence of the reflected light, using the correction amount calculation unit 113 and the correction unit 135. In addition, the correction amount calculation unit 113 and the correction unit 135 performs the correction, in a case where the peak value of the luminance of the image data is greater than the threshold value that is set in advance. In addition, the correction amount calculation unit 113 and the correction unit 135 does not perform the correction, in a case where the peak value of the luminance of the image data is smaller than the threshold value that is set in advance. As described above, in a case where the peak value of the luminance is small, the luminance of the image is low, and thus if the increase of the luminance caused by the reflected light is corrected, the excessive correction is performed. The projector 1 performs the correction in a case where the peak value of the luminance is greater than the threshold value, and does not perform the correction in a case where the peak value is equal to or smaller than the threshold value. Thus, it is possible to prevent the excessive correction from performing, and to efficiently perform the correction.

The correction amount calculation unit 113 estimates the intensity of the reflected light based on the luminance of the image data, and calculates the amount of correction corresponding to the estimated intensity of the reflected light. The correction unit 135 controls the light modulation device 4 based on the amount of correction that is calculated by the correction amount calculation unit 113. For this reason, it is possible to appropriately compensate for the influence of the reflected light, by estimating the intensity of the reflected light.

In addition, the projector 1 includes the characteristic amount acquisition unit 112 that acquires an amount of characteristic of the luminance of the image data. The correction amount calculation unit 113 estimates the intensity of the reflected light, based on the amount of characteristic that is acquired by the characteristic amount acquisition unit 112, and calculates the amount of correction with regard to at least one color, with regard to the image data of the color image. As a result, it is possible to rapidly estimate the intensity of the reflected light. In addition, the luminance for each color of the color image is corrected, and thus it is possible to prevent the color balance or the white balance from deviating. In addition, the projector 1 may perform the correction with regard to three colors of R, G, and B of the color image data, using the correction amount calculation unit 113.

In addition, the light modulation device 4 displays the image based on the image data and modulates the light that is emitted from the light source unit 3. The correction unit 135 corrects the luminance of the image that is displayed by the light modulation device 4, that is, the pixel value, depending on the amount of correction. For this reason, with regard to the image that modulates the light of the light source unit 3, the luminance is corrected depending on the amount of correction, and thus it is possible to appropriately correct the influence of the reflected light.

In addition, the light source unit 3 includes the excitation laser diode 62 that is a solid light source, and the fluorescent material substrate 61 that generates the light converted by excitation light which is emitted from the excitation laser diode 62, and has a configuration in which the converted light of the fluorescent material substrate 61 is incident on the light modulation device 4. For this reason, it is possible to compensate for the influence of the reflected light of the fluorescent material substrate 61 with a high reflection rate, and to prevent the display quality from decreasing due to the reflected light. The light source unit 3 includes the blue laser diode 59, the excitation laser diode 62, and the fluorescent material substrate 61 corresponding to the excitation laser diode 62. For this reason, it is assumed that due to the influence of the reflected light of the fluorescent material substrate 61, the luminance balance is deviated between the blue laser diode 59 and the excitation laser diode 62. In this configuration, the projector 1 compensates for the influence of the reflected light, and thereby it is possible to improve the display quality.

In addition, the light modulation device 4 includes the reflection type liquid crystal panels 4R, 4G, and 4B, and has a configuration in which the incident light emitted from the light source unit 3 is reflected to the light source unit 3 side. It is possible to compensate for the influence of the reflected light that is reflected from the reflection type liquid crystal panels 4R, 4G, and 4B to the light source unit 3 side, and to prevent the display quality from decreasing due to the reflected light.

In addition, the embodiment described above is just an example of a specific aspect to which the invention is applied, and is not intended to limit the invention, and it is possible to apply the invention as an aspect different from the embodiment described above. The above-described embodiment describes an example in which the R image signal and the G image signal are corrected by the gain control units 135R and 135G which are included in the correction unit 135, but the correcting method according to the invention is not limited to this. For example, the invention is not limited to an example in which the image signals of red (R) and green (G) are corrected, and the correction may be performed with respect to the image signal of at least one color of the three colors of R, G, and B. In addition, the image signal may be corrected with regard to all of the three colors of R, G, and B. In addition, for example, with respect to the image data that is processed in the image processing unit 131, the data of any one of the colors of R, G, and B, or the pixel value may be corrected depending on the amount of correction that is obtained from the amount of characteristic of the image. In addition, for example, the image signal that is input to the light modulation device drive unit 133 from the image processing unit 131 may be corrected in the step before the image signal is input to the light modulation device drive unit 133. Furthermore, as a configuration in which the image processing unit 131 outputs digital data to the light modulation device drive unit 133, the digital data may be corrected.

In addition, with reference to the formulas (1) to (5), the above-described embodiment describes an example in which the correction amount calculation unit 113 calculates the amount of correction using the peak value and APL of the image, but it is possible to calculate the amount of correction using the luminance histogram. In addition, even with regard to the amount of characteristic that is acquired by the characteristic amount acquisition unit 112, the invention is not limited to the peak value, the APL, and the luminance histogram.

Furthermore, with regard to all frames that configure the image data which is output from the image processing unit 131, the projector 1 may calculate the amount of correction using the correction amount calculation unit 113, but the invention is not limited to this. For example, the correction amount calculation unit 113 may obtain the amount of correction of another frame, except for the intermediate frame that is generated by the control unit 110 or the image processing unit 131. In addition, the amount of correction that is common to a plurality of frames may be obtained. Specifically, an average value of the amount of characteristic that is obtained by the characteristic acquisition unit 112 is obtained with respect to the plurality of frames, and the amount of correction based on the average value may be obtained, and the characteristic amount acquisition unit 112 may obtain the amount of characteristic from the plurality of frames.

In addition, an optical configuration of the projector 1 is not limited to the configuration that is illustrated in FIG. 2 and the above-described embodiment. The invention is not limited to a liquid crystal projector that includes the reflection type liquid crystal panels 4R, 4G, and 4B, and can be applied to a projector that uses a transmission type liquid crystal panel or a digital mirror device (DMD). In addition, the projector 1 is configured to generate the light of colors of R, G, and B, based on the light that is emitted from the blue laser diode array 53 and the excitation laser diode array 60 that are two laser light sources. Then, an example in which the light of the excitation laser diode array 60 is converted by the fluorescent material substrate 61, the light is divided, and the light of colors of R and G is generated, is described. The invention is not limited to this, and it is possible to arbitrarily change the number of laser light sources, the presence and absence of the fluorescent materials or a filter, and the like. In this case, the light of color that is corrected by the correction unit 135 may be selected with respect to the configuration of the optical system.

In addition, each function unit of the projector 1 illustrated in FIG. 1 has a functional configuration that is realized by a cooperation of hardware and software, and specific implementation thereof is not particularly limited. In addition, a detailed configuration of each unit of the projector 1 can also be modified arbitrarily within a range without departing from the scope of the invention.

What is claimed is:

1. A projector that displays an image based on image data, comprising:
    a light source;
    a modulation unit that modulates light which is emitted from the light source based on the image data; and
    a correction processing unit that controls the modulation unit so as to compensate for an influence of light reflected from the modulation unit to the light source side, based on luminance of the image data.

2. The projector according to claim 1,
    wherein the correction processing unit controls the modulation unit so as to suppress an increase of luminance occurring due to the influence of the reflected light.

3. The projector according to claim 1,
    wherein the correction processing unit controls the modulation unit so as to compensate for the influence of the reflected light, in a case where a peak value of the luminance of the image data is greater than a value that is set in advance.

4. The projector according to claim 1,
    wherein the correction processing unit does not control the modulation unit so as to compensate for the influence of the reflected light, in a case where a peak value of the luminance of the image data is lower than a value that is set in advance.

5. The projector according to claim 1,
    wherein the correction processing unit includes a correction amount calculation unit that estimates intensity of the reflected light based on the luminance of the image data and calculates an amount of correction corresponding to the estimated intensity of the reflected light, and a correction unit that controls the modulation unit based on the amount of correction which is calculated by the correction amount calculation unit.

6. The projector according to claim 5, further comprising:
    a characteristic amount acquisition unit that acquires an amount of characteristic of the luminance of the image data,
    wherein the correction amount calculation unit estimates the intensity of the reflected light based on the amount of characteristic that is acquired by the characteristic amount acquisition unit, and calculates the amount of correction with regard to at least one color, with regard to the image data of a color image.

7. The projector according to claim 5,
    wherein the correction amount calculation unit calculates the amount of correction with regard to three colors that configure the image data, with regard to the image data of a color image that is configured by three colors of red (R), green (G), and blue (B).

8. The projector according to claim 5,
    wherein the modulation unit displays an image based on the image data and modulates the light that is emitted from the light source, and
    wherein the correction unit corrects the luminance of the image that is displayed in the modulation unit depending on the amount of correction.

9. The projector according to claim 1,
    wherein the light source includes a solid light source, and fluorescent materials that generate light which is converted by excitation light which is emitted from the solid light source, and
    wherein the converted light of the fluorescent materials is incident on the modulation unit.

10. The projector according to claim 9,
    wherein the light source includes a first light source and a second light source,
    wherein at least one of the first and second light sources is configured by the solid light source, and
    wherein the fluorescent materials are included in correspondence with the solid light source.

11. The projector according to claim 1,
    wherein the modulation unit includes a reflection type liquid crystal display panel, and reflects incident light that is emitted from the light source to the light source side.

12. A method of controlling a projector that displays an image based on image data, the method comprising:
    modulating light that is emitted from a light source, based on the image data, using a modulation unit; and
    controlling the modulation unit so as to compensate for an influence of light reflected from the modulation unit to the light source side, based on luminance of the image data.

* * * * *